United States Patent Office 2,822,707
Patented Feb. 11, 1958

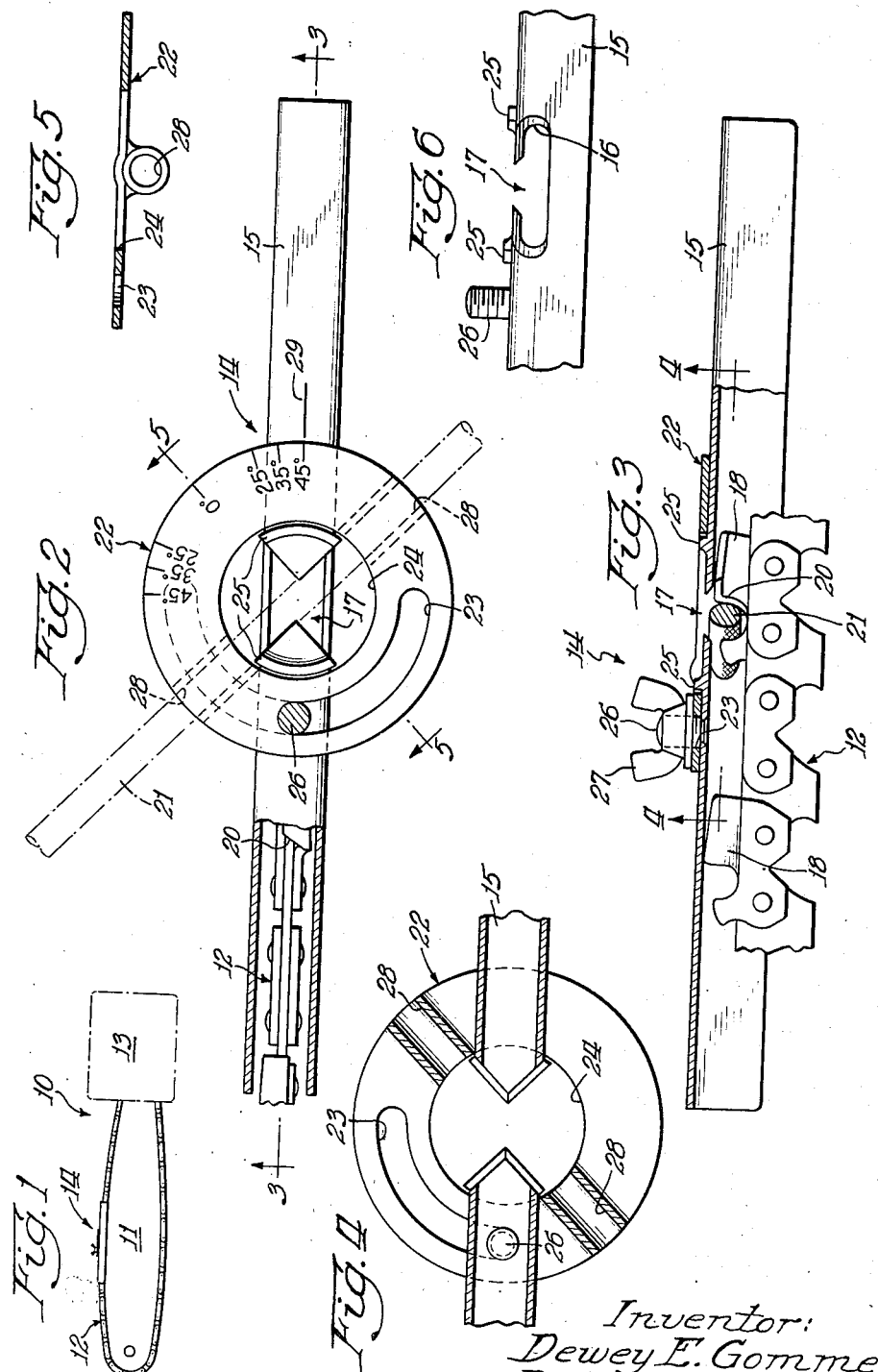

2,822,707

FILE HOLDER

Dewey E. Gommel, Indianapolis, Ind., assignor to Borg-Warner Corporation, Chicago, Ill., a corporation of Illinois Application August 5, 1955, Serial No. 526,712

2 Claims. (Cl. 76—36)

The present invention relates in general to file holders for use in filing projecting portions formed on the longitudinal edge of a cutting tool and more particularly to a file holder for use in filing the beveled cutting edges on the cutting teeth of a chain saw.

In conventional power operated chain saws, the saw chain utilized includes right and left hand cutter teeth for cutting away both sides of the kerf in the material being sawed and the cutting edges of these cutter teeth are generally hook shaped or concavely beveled whereby they may be sharpened by the use of a round file.

The principal object of the present invention is, therefore, to provide a new and improved file holder for use in sharpening concavely beveled cutting edges on the cutting teeth of a chain saw.

A more detailed object of the present invention is to provide a file holder adapted for use in guiding the filing of chain saw cutter teeth so that it is unnecessary to remove the saw chain from the chain saw assembly.

A still further object of the present invention is to provide a file holder, for use in filing the concavely beveled cutting edges of chain saw cutter teeth, having an adjustable guide means for facilitating sharpening both right and left hand chain saw cutter teeth.

Another object of the present invention is to provide a file holder of the aforementioned general character and including means defining a channel shaped portion adapted to receive a longitudinal edge of the chain saw therein for maintaining alignment of the file holder with reference to the chain saw cutter teeth while the teeth are being filed.

The foregoing and numerous other objects and numerous advantages of the present invention will become apparent from the following detailed description when read in conjunction with the accompanying drawing, wherein:

Fig. 1 is a schematic view illustrating a conventional chain saw having the file holder comprising the subject matter of the present invention disposed in position over the saw chain to enable reciprocation of a file in order to sharpen the cutting teeth of the saw chain;

Fig. 2 is a plan view showing the file holder comprising the subject matter of the present invention;

Fig. 3 is a partial sectional view taken substantially along the line 3—3 in Fig. 2 and looking in the direction of the arrows;

Fig. 4 is a sectional view taken substantially along the line 4—4 in Fig. 3 and looking in the direction of the arrows and shows the details of the file guide means;

Fig. 5 is a sectional view of the file guide means; and

Fig. 6 is a fragmentary view illustrating the recess in the channel shaped member for enabling the exposure of a selected cutting tooth in a position to be slidingly engaged by a reciprocable file.

With reference to the drawings, reference numeral 10 has been used to identify a conventional chain saw assembly having a supporting board 11 around which a saw chain 12 traverses. The saw chain 12 is driven by a motor 13 which may be electrically driven or powered by gasoline or some other fuel, as desired.

The file holder comprising the subject matter of this invention is designated in Fig. 1 generally by reference numeral 14 and the details of the file holder 14 are shown in Figs. 2-6. The file holder 14 comprises an elongate generally channel shaped or U-shaped member 15 adapted to receive the saw chain 12 therein. The channel shaped member 15 is cut away in the medial region thereof, as indicated at 16, to provide a recess 17.

When the channel shaped member 15 is disposed with the saw chain 12 therein, it may be moved longitudinally to bring the recess 17 over one of any of the plurality of cutter links 18 of the chain to thereby expose the cutting edge 20 on the selected cutter link so that it may be slidingly engaged by a file 21.

In order to hold the file 21 in alignment with the cutting edge 20 exposed in the recess 17, suitable file guide means designated by reference numeral 22 are provided. The file guide means 22 comprises an annular member having a substantially 90° arcuate slot 23 cut therein. The file guide means 22 is further provided with a rather accurately formed circular inner periphery 24 which cooperates with a pair of guide lugs 25 formed on the channel shaped member 15 in order to position or locate the guide means on the channel shaped member 15.

In order to hold the guide means 22 in fixed position relative to the channel shaped member 15, a suitable screw threaded stud 26 is secured to the channel shaped member 15 so that it projects through the arcuate slot 23. A wing nut 27 may be turned down against guide means 22 in order to hold it in fixed position on the member 15.

The guide means 22 is provided with two diametrically opposed cylindrical file guides 28 adapted to have the round file 21 disposed therein for accurately guiding the file during the filing operation. The guide openings 28 have a slightly greater diameter than the diameter of the file 21, and, as a result, the file may be rotated during the filing operation.

The channel shaped member 15 is provided with a mark 29 which may be used in conjunction with degree markings around the outer periphery of the guide means 22 in order to indicate the position of the guide means 22 relative to the channel shaped member 15.

In the operation of the file holder disclosed herein it is not necessary to disassemble the chain saw in order to sharpen the cutting edges of the teeth thereof by the use of the holder comprising the subject matter of the present invention. The file holder is merely placed over the longitudinal extending section of saw chain 12 on the upper edge of the guide board 11 with one of the cutter teeth 18 exposed in the medial recess 17. The guide means 22 is then adjusted until the angularity thereof corresponds with the desired degree of bevel to be imparted to the cutter. The round file 21 is then manually reciprocating while in sliding engagement with the cutting edge 20 of the selected exposed cutter tooth 18 until the cutting edge 20 is suitably sharpened. During the manual reciprocation of the file 21 it may be rotated, at will, and this insures that a maximum of the cutting area of the file will be utilized.

After one cutter tooth 18 is sharpened, the file 21 may be lifted and the file holder moved longitudinally therewith until the next cutter tooth is exposed in the recess 17, in a position to be engaged by the file.

In conventional saw chain the cutter teeth 18 are alternately of the right and left hand configuration and the arcuate slot 23 permits manual adjustment of the guide means 22 relative to the channel shaped member 15 to facilitate sharpening cutter teeth of both right and left hand configurations.

Other advantages of the present file holder arise due to the angular adjustability of the guide means which enables the filing of any desired shear angle on the tooth cutting edge 20. The file holder also maintains the proper height of the file relative to the cutter teeth, thereby properly locating the shear surface on the leading edge of the cutter tooth and eliminating the possibility of forming a cutting edge which is too blunt or too hooked.

It is contemplated that the internal width of the channel shaped portion 15 of the present file holder may be sufficiently great to enable the file holder to accommodate saw chain of a variety of sizes. Even though the width of the saw chain being sharpened is substantially less than the internal dimension of the channel shaped member 15, the file holder is still effective to guide the file with sufficient accuracy to properly sharpen the saw chain cutter teeth. In actual practice the file holder 14 is positioned over the saw chain and the file is reciprocated by grasping each end, the channel shaped member 15 being effective to properly guide the file so that the filing operation is simple and accurate.

It is contemplated that numerous changes and modifications may be made in the present invention without departing from the spirit or scope thereof.

What is claimed is:

1. A file holder for use in sharpening the beveled cutting edges of right and left hand saw chain teeth disposed along a longitudinal edge of a chain saw, said holder comprising an elongate member including means defining a generally channel shaped portion adapted for receiving said longitudinal edge of the chain saw therein, said member further including means defining a recess adapted for exposing the cutting edge of a tooth disposed in said channel shaped portion, and angularly adjustable generally circular guide means having cylindrical file guide openings therein of slightly greater dimensions than the file and mounted on said member for aligning a file with exposed cutting edge of a selected right or left hand saw chain tooth for sliding contact therewith, whereby the file may be reciprocated to thereby sharpen the cutting edge of the selected tooth.

2. A device for sharpening the bevel cutting edges of right and left hand saw chain teeth disposed along a longitudinal edge of a chain saw comprising, in combination, a round file and a file holder comprising an elongate member having a generally channel shaped portion adapted for receiving said longitudinal edge of the chain saw therein, said member further including means in a medial region thereof defining a recess for exposing the cutting edge of a tooth disposed in said channel shaped portion, and angularly generally circular adjustable guide means mounted on said member and having rounded file guide recesses therein of slightly greater diameter than the diameter of said file for aligning said file with the exposed cutting edge of a selected right or left hand saw chain tooth for sliding contact therewith, whereby the file may be reciprocated to thereby sharpen the cutting edge on the selected tooth.

References Cited in the file of this patent

UNITED STATES PATENTS

| | | |
|---|---|---|
| 409,866 | Penrose | Aug. 27, 1889 |
| 2,171,169 | Woodbury | Aug. 29, 1939 |
| 2,495,991 | Speed | Jan. 31, 1950 |
| 2,594,821 | Stone et al. | Apr. 29, 1952 |
| 2,633,761 | Butts | Apr. 7, 1953 |
| 2,662,423 | Greenlee | Dec. 15, 1953 |
| 2,677,289 | Fitch | May 4, 1954 |
| 2,707,409 | Fitch | May 3, 1955 |
| 2,736,216 | Paradis et al. | Feb. 28, 1956 |
| 2,737,830 | Siverson et al. | Mar. 13, 1956 |

U. S. DEPARTMENT OF COMMERCE
PATENT OFFICE
CERTIFICATE OF CORRECTION

Patent No. 2,822,707                  February 11, 1958

Dewey E. Gommel

It is hereby certified that error appears in the printed specification of the above numbered patent requiring correction and that the said Letters Patent should read as corrected below.

Column 4, line 15, strike out "generally circular" and insert the same after "adjustable", same line.

Signed and sealed this 22nd day of April 1958.

(SEAL)
Attest:
KARL H. AXLINE

Attesting Officer

ROBERT C. WATSON
Commissioner of Patents